United States Patent [19]

Ohnishi

[11] Patent Number: 5,283,872
[45] Date of Patent: Feb. 1, 1994

[54] SCSI DEVICE HAVING TRANSFER PARAMETER STORAGE MEMORY BLOCKS WHICH CORRESPOND TO EACH APPARATUS

[75] Inventor: Masatoshi Ohnishi, Kasugai, Japan

[73] Assignees: Fujitsu Limited, Kawasaki; Fujitsu VLSI Limited, Kasugai, both of Japan

[21] Appl. No.: 668,554

[22] Filed: Mar. 13, 1991

[30] Foreign Application Priority Data

Mar. 15, 1990 [JP] Japan .................................. 2-65133

[51] Int. Cl.$^5$ .............................................. G06F 15/16
[52] U.S. Cl. ..................... 395/325; 395/275; 395/725; 395/400
[58] Field of Search ............. 395/275, 325, 725, 400, 395/200; 364/200

[56] References Cited

U.S. PATENT DOCUMENTS

| | | | |
|---|---|---|---|
| 4,229,791 | 10/1980 | Levy et al. | 364/200 |
| 4,232,366 | 11/1980 | Levy et al. | 395/325 |
| 4,688,166 | 8/1987 | Schneider | 395/275 |
| 4,783,705 | 11/1988 | Moon et al. | 364/200 |
| 4,805,097 | 2/1989 | DeSanna | 395/400 |
| 4,864,291 | 9/1989 | Korpi | 364/200 |
| 4,965,801 | 10/1990 | Dulac | 364/200 |
| 4,972,313 | 11/1990 | Getson, Jr. et al. | 395/325 |
| 4,974,153 | 11/1990 | Pimm et al. | 364/200 |
| 4,987,530 | 1/1991 | Wagner et al. | 395/275 |
| 5,033,049 | 7/1991 | Keener et al. | 395/275 |
| 5,067,071 | 11/1991 | Schanin et al. | 395/275 |
| 5,068,785 | 11/1991 | Sugiyama | 395/325 |
| 5,081,578 | 1/1992 | Davis | 395/325 |
| 5,113,500 | 5/1992 | Talbott et al. | 395/325 |
| 5,150,465 | 9/1992 | Bush et al. | 395/275 |
| 5,175,822 | 12/1992 | Dixon et al. | 395/275 |

FOREIGN PATENT DOCUMENTS 0089440 9/1983 European Pat. Off. .
0255593 2/1988 European Pat. Off. .

OTHER PUBLICATIONS

"NCR 53C90 Enhanced SCSI Processor Data Sheet", NCR Microelectronics Division, Rev. 3.0, Nov. 1987.
"Locating Specialized Controller Microcode on Device Cards", Canova et al., IBM Technical Disclosure Bulletin, vol. 25, No. 10, Mar., 1983, pp. 5240–5241.
"Design Considerations for a SCSI Disk Controller Chip", DuLac, 8080 Wescon Proceedings, Nov. 19–22, 1985.

Primary Examiner—Allen R. MacDonald
Assistant Examiner—Tariq R. Hafiz
Attorney, Agent, or Firm—Nikaido, Marmelstein, Murray & Oram

[57] ABSTRACT

In a SCSI device in a small computer system including a plurality of apparatuses, each apparatuses having a SCSI device connected to the apparatus by a MPU bus, and connected to each other through the SCSI device and a SCSI bus. Further each apparatus has an identification (ID) code, and the SCSI device includes; an ID setting register operatively connected to the MPU bus for setting the ID code of another device; an address decoder operatively connected to the ID setting register for decoding the ID code; a transfer parameter storage unit operatively connected to the MPU bus and the address decoder for storing the transfer parameters for all apparatuses constituting the small computer system, and divided into a plurality of memory blocks equivalent to number of the apparatuses to store the transfer parameters for each apparatus; a register operatively connected to the MPU bus for storing various data from the MPU bus; a read/write control unit for receiving a read/write signal and an address signal from the microprocessor, and outputting these signals to the ID setting register, the transfer parameter storage unit, and the register; a data FIFO connected between the SCSI bus and the MPU bus for temporarily storing data; and a transfer control unit operatively connected to the data FIFO and the transfer parameter storage unit for controlling the transfer of the data based on a request signal and an acknowledge signal from the other device through the SCSI bus.

12 Claims, 14 Drawing Sheets

SCSI DEVICE HAVING TRANSFER PARAMETER STORAGE MEMORY BLOCKS WHICH CORRESPOND TO EACH APPARATUS

BACKGROUND OF THE INVENTION

1. Field of the Invention

The present invention relates to a SCSI (Small Computer System Interface) device in a small computer system, more particularly, it relates to a SCSI device having an improved transfer parameters setting method when transferring data between SCSI devices. The transfer parameters are used for transferring data between SCSI devices.

2. Description of the Related Art

Recently, SCSI devices have been widely used as a standard interface in the field of small computer systems, such as personal computers and work stations. In general, a SCSI device is provided for each apparatus, for example, a host computer, hard disk, facsimile, laser printer and the like, constituting a small computer system. In this case, all of the SCSI devices an connected to each other through a SCSI-bus.

The SCSI device has a standard protocol defined by ANSI (American National Standard Institute). According to the ANSI standard, it is possible to connect eight SCSI devices as a maximum value through the SCSI-bus, and data transfer width is defined as eight bits in the SCSI-bus in the SCSI-1. Further, in the SCSI-2, data transfer width is defined as three kinds of eight bits, sixteen bits and thirty-two bits. Further, two different modes, i.e., asynchronous mode and synchronous mode, are provided as data transfer modes in the SCSI devices. The present invention relates to the transfer parameters setting method in the synchronous mode.

SUMMARY OF THE INVENTION

The object of the present invention is to provided an improved SCSI device enabling high speed data transmission between the apparatuses in a small computer system.

In accordance with the present invention, there is provided a SCSI device in a small computer system including a plurality of apparatuses, each of apparatuses having a SCSI device connected to the apparatus by a MPU (microprocessor) bus, and connected to each other through the SCSI device and a SCSI bus, and each apparatus having an identification (ID) code. The SCSI device comprises; an ID setting register operatively connected to the MPU bus for setting the ID code of the other party; an address decoder operatively connected to the ID setting register for decoding the ID code; a transfer parameter storage unit operatively connected to the MPU bus and the address decoder for storing the transfer parameters for all apparatuses constituting the small computer system, and being divided into a plurality of memory blocks equivalent to number of the apparatus to store the transfer parameters for each apparatus; a register operatively connected to the MPU bus for storing various data from the MPU bus; a read/write control unit for receiving a read/write signal and an address signal from the microprocessor, and outputting these signals to the ID setting register, the transfer parameter storage unit, and the register; a data FIFO connected between the SCSI bus and the MPU bus for temporarily storing data; and a transfer control unit operatively connected to the data FIFO and the transfer parameter storage unit for controlling the transfer of the data based on a request signal and an acknowledge signal from the SCSI bus.

In the preferred embodiment, each memory block is divided into three memory areas each storing synchronous transfer offset data, synchronous transfer period data, and transfer width data.

In the preferred embodiment, the transfer parameter storage unit comprises three random access memories RAMs 1 to 3, a first RAM 1 storing the synchronous transfer offset data, a second RAM 2 storing the synchronous transfer period data, and a third RAM 3 storing the transfer width data.

In the preferred embodiment, the ID setting register comprises three flip-flop circuits for receiving the address signal and the ID code, and outputting the ID code in parallel to address terminals in each of RAMs 1 to 3.

In the preferred embodiment, the transfer parameter storage unit comprises a synchronous transfer offset register for previously storing the synchronous transfer offset data, a synchronous transfer period register for previously storing the synchronous transfer period data, and a transfer width register for previously storing transfer width data.

In the preferred embodiment, the register comprises eight macro cell, each macro cell corresponding to one apparatus.

In the preferred embodiment, each macro cell comprises eight flip-flop circuits, each flip-flop circuit receiving one bit of data; eight AND circuits connected to the eight flip-flop circuits, each AND circuit receiving an ID code; and an OR circuit connected to eight AND circuits for receiving outputs of eight AND circuits.

In the preferred embodiment, the SCSI device further comprises a nexus ID preparation unit operatively connected to the SCSI bus, and a nexus ID register operatively connected to the nexus ID preparation unit and the address decoder; the nexus ID preparation unit outputting the ID code of the other SCSI device to the nexus ID register, the ID code to be transferred from the nexus ID preparation unit to the nexus ID register being obtained by eliminating the ID code of its own SCSI device after an OR operation for its own ID code and the ID code of the other device on the SCSI-bus, and the nexus ID register outputting the ID code of the other device to the address decoder to set the transfer parameters of the other device.

In the preferred embodiment, the SCSI device further comprises a selection circuit for selecting either the ID setting register or the nexus ID register based on a data phase start signal on the SCSI-bus.

In the preferred embodiment, the selection circuit comprises three AND circuits for receiving the output of the ID setting register and an inverted data phase start signal, three AND circuits for receiving the output of the nexus ID register and the data phase start signal, and OR circuits for receiving outputs of all AND circuits and outputting the ID code to the address terminals in each of RAMs 1 to 3.

In the preferred embodiment, the nexus ID register comprises three flip-flop circuits for receiving the ID code from the nexus ID preparation circuit, and outputting the ID code in parallel to the selection circuit.

In the preferred embodiment, the nexus ID preparation circuit comprises a register for receiving its own ID code, a decoder for decoding the ID code, eight AND circuits for receiving the output of the decoder and the data from the SCSI bus, and an encoder for receiving the output of the AND circuits and outputting the ID code to the nexus ID register.

DESCRIPTION OF THE PREFERRED EMBODIMENTS

Before describing the preferred embodiments of the present invention, an explanation will be given of a conventional SCSI device.

Figure 1:
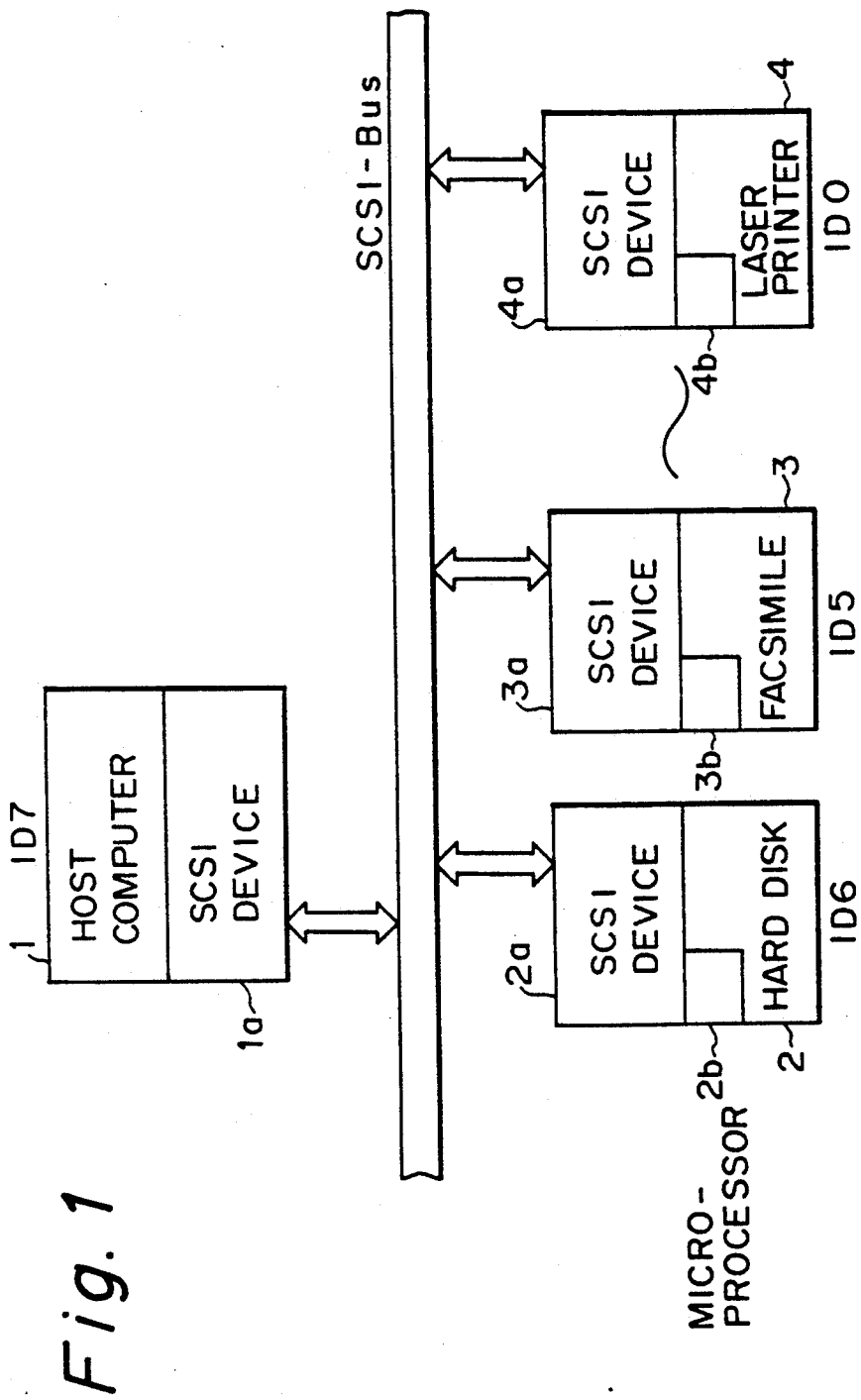
FIG. 1 is a schematic block diagram of a typical small computer system, each apparatus having a SCSI device.

FIG. 1 is a schematic block diagram of a typical small computer system. In FIG. 1, reference number 1 denotes a host computer, 2 a hard disk, 3 a facsimile device, and 4 a laser printer. Reference numbers 1a to 4a denote SCSI devices, each of the SCSI devices being respectively provided for each of apparatuses 1 to 4, and connected to each other through a SCSI-bus. Each apparatus has an ID code indicating a priority order among the apparatuses. The data transfer between apparatuses is performed through the SCSI devices and the SCSI-bus.

Figure 2:
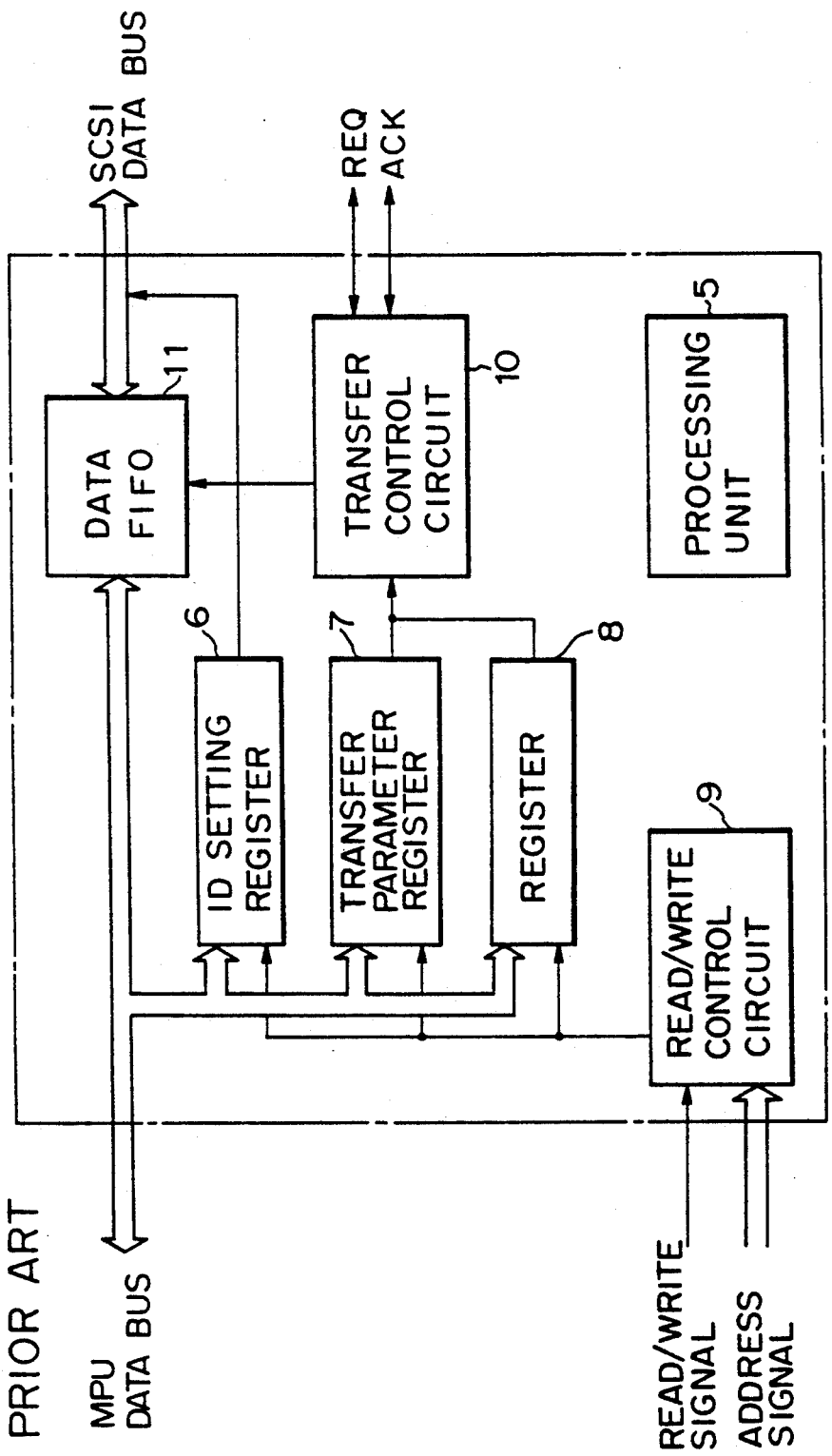
FIG. 2 is a block diagram of a conventional SCSI device.

FIG. 2 is a block diagram of a conventional SCSI device. This SCSI device is disclosed in "ENHANCED SCSI PROCESSOR", model NCR 53C90. In FIG. 2, reference number 5 denotes a processing unit, 6 an ID setting register, 7 a transfer parameter register, 8 a register, 9 a read/write control circuit, 10 a transfer control circuit, and 11 a data FIFO. The ID setting register 6 stores the ID code of another device (i.e., a destination apparatus), and the transfer parameter register 7 stores synchronous transfer offset data, synchronous transfer period data, and transfer width data as the transfer parameters. A microprocessor MPU is provided in the hard disk 2, the facsimile 3 and the laser printer 4. The microprocessor generates a read/write signal and an address signal and sends them to the read/write control circuit 9. Various data from the microprocessor are stored in the registers 6 to 8 based on the read/write signal and the address signal through the read/write control circuit 9.

REQ denotes a request signal generated from a target, and ACK denotes an acknowledge signal generated from an initiator. These signals REQ and ACK are used for requesting and confirming the transfer of data between SCSI devices. The outputs of the transfer parameter register 7 and register 8 are input to the transfer control circuit 10. The transfer control circuit 10 controls input/output of the data in the FIFO (first in - first out). For example, in case of a data transfer from the host computer 1 to the hard disk 2, the host computer 1 selects only transfer parameters of the hard disk 2 from among previously determined transfer parameters of the hard disk 2, the facsimile 3, and the laser printer 4. The transfer parameters of the hard disk 2 selected by the host computer 1 are output by the host computer 1 to its own SCSI device 1a, and stored in the transfer parameter register 7 of the SCSI device 1a. In the hard disk 2, the microprocessor 2b selects only transfer parameters of the host computer 1 from among previously determined transfer parameters of the host computer 1, the facsimile 3, and the laser printer 4. The transfer parameters of the host computer 1 are output by the microprocessor 2b to its own SCSI device 2a, and stored in the transfer parameters register 7 of the SCSI device 2a. When the transfer parameters of the host computer 1 and the hard disk 2 are stored in the transfer parameter register 7 of the SCSI device, the data transfer is started from the host computer 1 to the hard disk 2.

There are, however, some problems in the above mentioned conventional SCSI device as explained below. For example, when the host computer 1 changes the destination of the transfer to new destination, for example, from the hard disk 2 to the facsimile 3, the host computer 1 outputs the newly selected transfer parameters of the facsimile 3 to the SCSI device 1a, and the content of the transfer register 7 of the SCSI device 1a is rewritten from the transfer parameters of the hard disk 2 to that of the facsimile 3. Further, in the facsimile 3, the microprocessor 3b selects the transfer parameters of the host computer 1 and outputs the transfer parameters of the host computer 1 to its own SCSI device 3a.

Accordingly, the content of the transfer parameter register 7 of the SCSI device 3a is rewritten from previous transfer parameter to that of the host computer 1. Accordingly, in each SCSI device, it is necessary to rewrite the transfer parameters of the transfer parameter register 7 of the corresponding SCSI device whenever the destination of the transfer is changed.

Accordingly, as a result, a number of responses for data transfer are necessary between the SCSI devices so that transfer efficiency between these devices is considerably reduced in the conventional small computer system. Further, the amount of software to control data transfer (i.e., control programs for operating the host computer and the microprocessor) is also increased in the conventional art.

Therefore, the object of the present invention is an improvement in the transfer efficiency between SCSI devices by reducing the number of operations required for setting transfer parameters, and realization of high speed data transfer between the host computer and other systems in a small computer system.

A SCSI device according to the present invention is explained in detail hereinafter.

Figure 3:
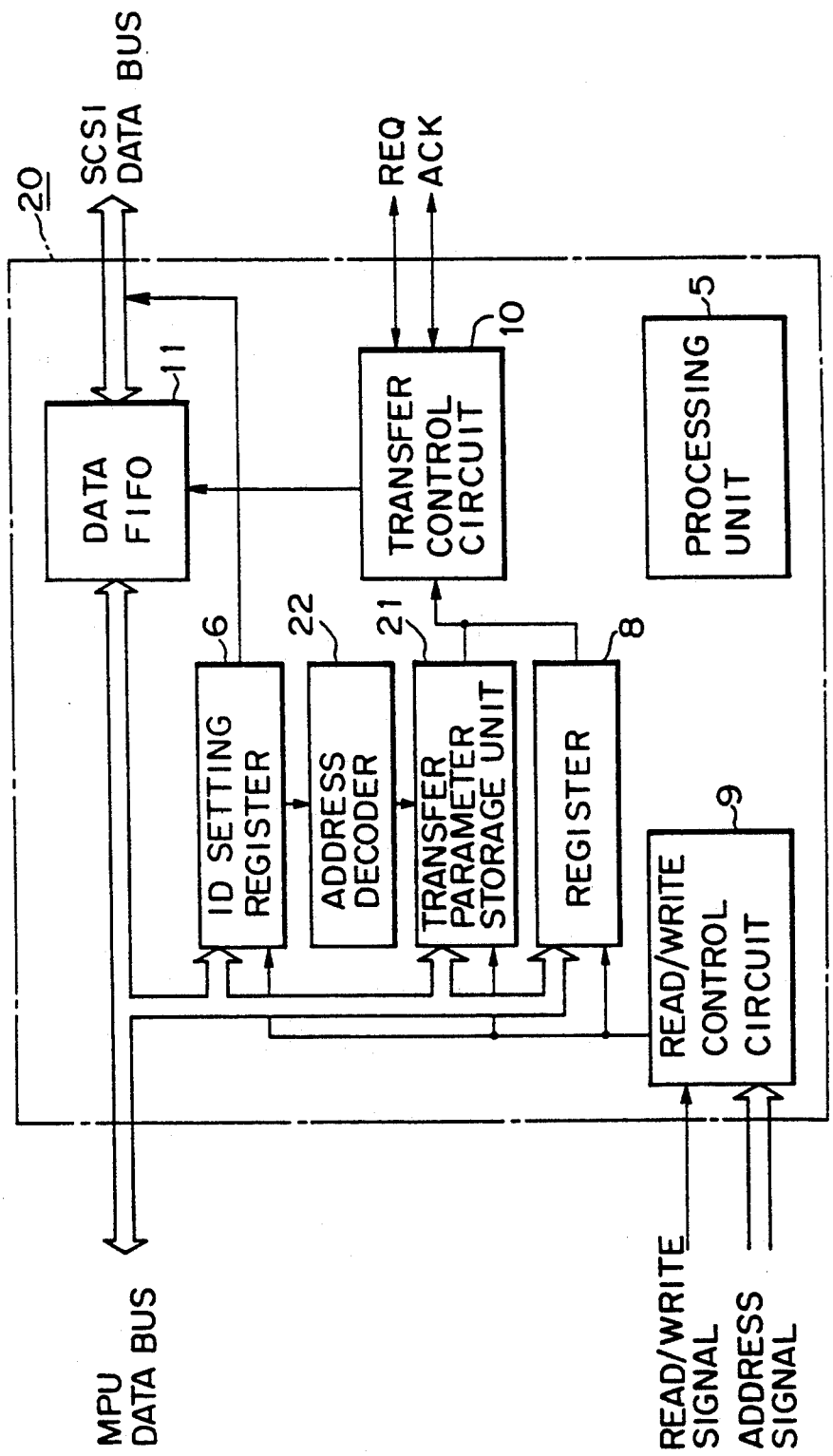
FIG. 3 is a schematic block diagram of a SCSI device according to a first embodiment of the present invention.

FIG. 3 is a schematic block diagram of a SCSI device according to a first embodiment of the present invention. The same reference numbers as used in FIG. 2, are attached to the same components in this drawing. In FIG. 3 reference number 20 denotes a SCSI device according to the present invention, 21 denotes a transfer parameter storage unit, and 22 denotes an address decoder. As shown in the drawing, in the first embodiment, the transfer parameter register 7 of FIG. 2 is replaced by the transfer parameter storage unit 21. The address register 22 is provided between the ID setting register 6 and the transfer parameter storage unit 21.

Figure 4:
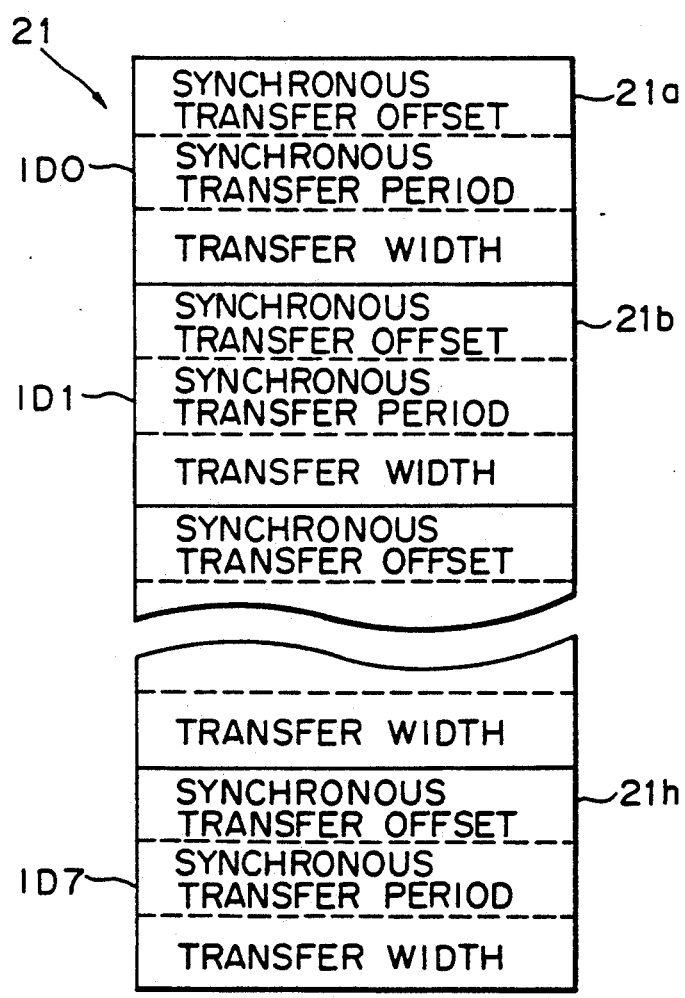
FIG. 4 is a structural view of the transfer parameter storage unit shown in FIG. 3.

FIG. 4 is a structural view of the transfer parameter storage unit shown in FIG. 3. As shown in FIG. 4, the transfer parameter storage unit 21 according to the present invention has eight blocks 21a to 21h. Each block corresponding to a block shown in FIG. 1. That is, the first block 21a is used for storing the transfer parameters of the laser printer (ID0), and the eighth block 21h is used for storing the transfer parameters of the host computer (ID7) 1.

Further, each block 21a to 21h is divided into, for example, three memory areas to store synchronous transfer offset data, synchronous transfer period data, and transfer width data as the transfer parameters.

In the data transfer between the SCSI devices, the read/write signal and the address signal from the microprocessor are input to the ID setting register 6, the transfer parameter storage unit 21, and the register 8 through the read/write control circuit 9. The ID code of the another device is stored in the ID setting register 6. The transfer parameters for the first apparatus and the other device, i.e., the synchronous transfer offset data, synchronous transfer period data, and transfer width data are previously stored in the transfer parameter storage unit 21. Further, various data from the microprocessor MPU are stored in the register 8.

The address decoder 22 decodes the ID code stored in the ID setting register 6, and accesses the memory area storing the transfer parameters of the other party in the transfer parameter storage unit 21. The transfer parameters of the other device are output to the transfer control circuit 10. The transfer control circuit 10 receives the request signal REQ and the acknowledge signal ACK from the SCSI-bus, receives both the contents of the register 8 and the transfer parameter storage unit 21. Further, the transfer control circuit 10 controls the data FIFO so that the data is transferred to the microprocessor in the first device or to the other device. The data FIFO is provided between the SCSI bus and the MPU bus for temporarily storing the data. Accordingly, when the data are repeatedly transferred between SCSI devices, the present invention is very effective for enabling high speed data transfer between the apparatuses because only the ID code of the other device is set in the ID setting register and it is not necessary to set the transfer parameters of the other device for every synchronous data transfer operation.

Figure 5:
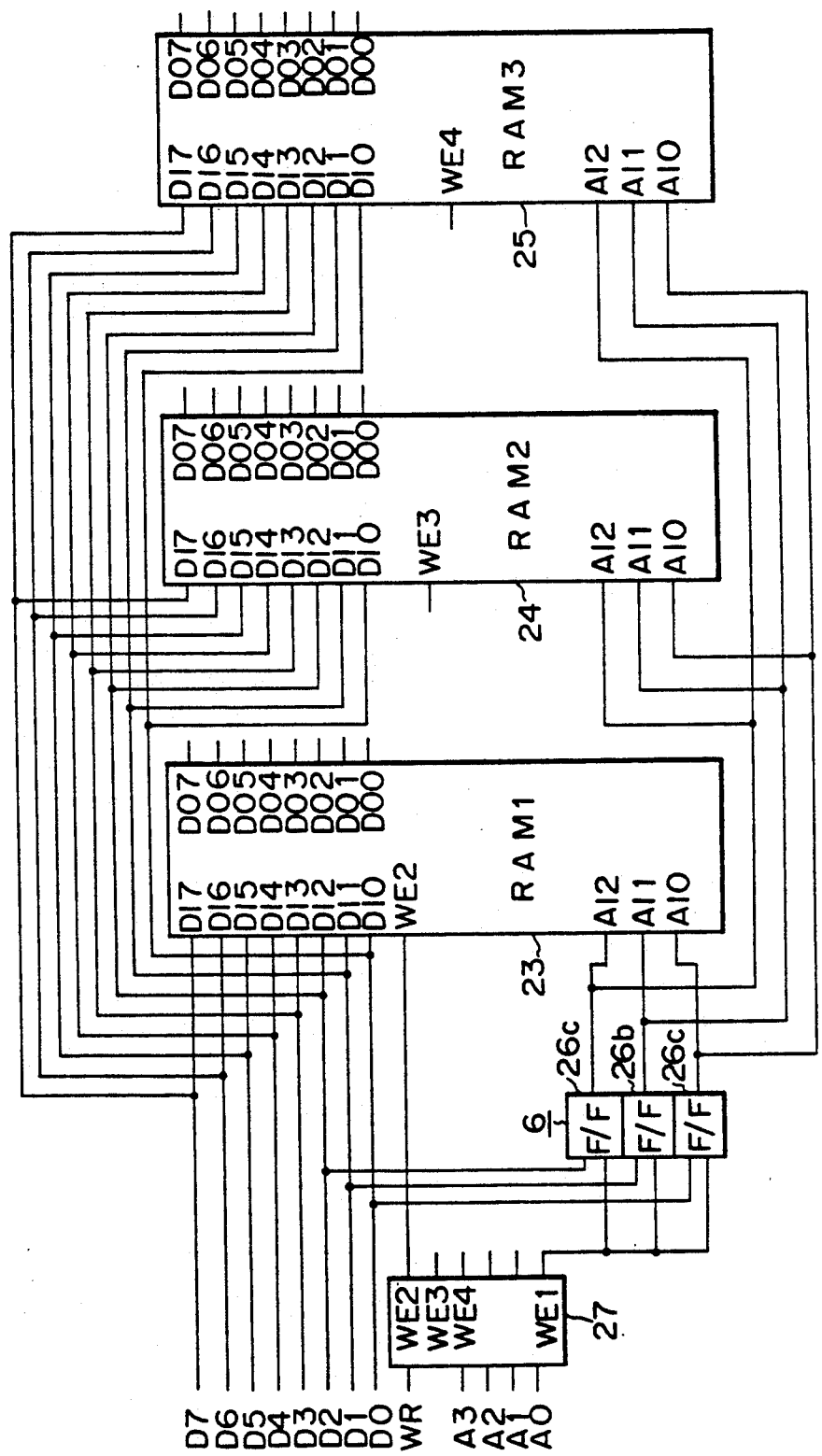
FIG. 5 is a detailed block diagram of one example of the ID setting register and the transfer parameter storage unit shown in FIG. 3.

FIG. 5 is a detailed block diagram of one example of the ID setting register and the transfer parameter storage unit shown in FIG. 3. In FIG. 5, RAM 1 denotes a transfer offset setting memory, RAM 2 a transfer period setting memory, and RAM 3 a transfer width memory. Accordingly, the RAM 1 stores the synchronous transfer offset data 21a to 21h, the RAM 2 stores the synchronous transfer period data 21a to 21h, and the RAM 3 stores the transfer width data. Further, each of RAMs 1 to 3 includes an address decoder having address input terminals AI0 to AI2. The data having eight bits D0 to D7 from the microprocessor are input in parallel to the RAM 1 to RAM 3. In each RAM, DI0 TO DI7 denote input terminals, and DO0 TO DO7 denote output terminals.

The ID setting register 6 is constituted by three flip-flop circuits 26a to 26c. Three bits D0 to D2 of the data from the microprocessor are input to the corresponding flip-flop circuits 26a to 26c. The outputs of the flip-flop circuits 26a to 26c are input in parallel to the address input terminals AI0 to AI3 in the RAMs 1 to 3. The selector 27 receives the address signals A0 to A3 and the write signal WR from the microprocessor. The selector 27 selects one of the read/write signal lines WE based on the address signals A0 to A3, and outputs the write signal WR through the selected read/write signal line WE. In FIG. 5, for example, when the address signals A3 to A0 are given as "0001", the read/write signal line WE1 is selected and the write signal WR is output in parallel to the flip-flop circuits 26a to 26c. When the address signals A3 to A0 are given as "0010", the read/write signal line WE2 is selected and the write signal WR is output to the RAM 1. When the address signals A3 to A0 are given as "0011", the read/write signal line WE3 is selected and the write signal WR is output to the RAM 2. When the address signals A3 to A0 are given as "0100", the read/write signal line WE4 is selected and the write signal WR is output to the RAM 3.

The ID code of the other device is expressed by three bits D0 to D2, and this ID code is input in parallel to the RAMs 1 to 3 to store the transfer parameters of the other party. For example, when the ID code of the other device is given as "ID0", the ID code of the ID0 is given as "000". When the ID code of the other device is given as "ID1", the ID code of the ID1 is given as "001". When the ID code of the other device is given as "ID6", the ID code of the ID6 is given as "110".

When the address signals A0 to A3 are given as "0001", the write signal WR from the microprocessor is input to the ID setting register 6 through the signal line WE1. Accordingly, the data corresponding to the ID code are set in the ID setting register 6, and data are output in parallel from the ID setting register 6 to the address terminals AI0 to AI2 of the RAMs 1 to 3.

When the address signals A0 to A3 are given as "0010", the write signal WR from the microprocessor is input to the transfer offset setting memory RAM 1 through the signal line WE2. Further, when the synchronous transfer offset data D0 to D7 of the other party are input to the input terminals DI0 to DI7 of the RAM 1, the transfer offset data are written in the RAM 1 in accordance with the address signals AI0 to AI2 accessed by the ID setting register 6.

Further, when the address signals A0 to A3 are given as "0011", the write signal WR from the microprocessor is input to the transfer period setting memory RAM 2 through the signal line WE3. When the synchronous transfer period data D0 to D7 of the other device are input to the input terminals DI0 to DI7 of the RAM 2, the transfer period data are written in the RAM 2 in accordance with the address signal AI0 to AI2 accessed by the ID setting register 6.

Still further, when the address signals A0 to A3 are given as "0100", the write signal WR from the microprocessor is input to the transfer width memory RAM 3 through the signal line WE4. When the transfer width data D0 to D7 of the other device are input to the input terminals DI0 to DI7 of the RAM 3, the transfer width data D0 to D7 are written in the RAM 3 in accordance with the address signals AI0 to AI2 accessed by the ID setting register 6.

Accordingly, for example, in the case of a laser printer having the ID code ID0, the transfer offset data as the transfer parameter of the laser printer is set in the transfer parameter storage unit 21 as follows. In this case, three bits D0 to D2 are given as "000" and the address signals A0 to A3 are given as "0001". Accordingly, the signal line WE1 is selected and the write signal WR is input to the ID setting register 6 so that three bits "000" are stored in the flip-flop circuits 26a to 26c. That is, each bit "0" is stored in each flip-flop circuit. Next, when the address signals A0 to A3 are given as "0010", the write signal WR is input to the RAM 1 through the signal line WE2, and the synchronous transfer offset data D0 to D7 of the laser printer 4 is written in the memory area of the address "000" in the RAM 1.

Further, when the address signals A0 to A3 are given as "0011", the write signal WR is input to the RAM 2 through the signal line WE3, and the synchronous transfer period data D0 to D7 of the laser printer 4 are written in the memory area of the address "000" in the RAM 2. Still further, when the address signals A0 to A3 are given as "0100", the write signal WR is input to the RAM 3 through the signal line WE4, and the transfer width D0 to D7 of the laser printer 4 are written in the memory area of the address "000" in the RAM 3.

In the data transfer, the ID code of the other party D0 to D2 is output to the ID setting register 6, and the write signal WR is input to the ID setting register 6 when the address signals A0 to A3 are given as "0001". As a result, the data having three bits D0 to D2 are set to the flip-flop circuits 26a to 26c so that the address corresponding to the ID code of the other party is accessed in the RAMs 1 to 3.

In this stage, since the write signal WR is not input to the RAMs 1 to 3, the transfer offset data is output from the output terminals DO0 to DO7 in the RAM 1, the transfer period data is output from the output terminals DO0 to DO7 in the RAM 2, and the transfer width data is output from the output terminals DO0 to DO7 in the RAM 3.

Figure 6:
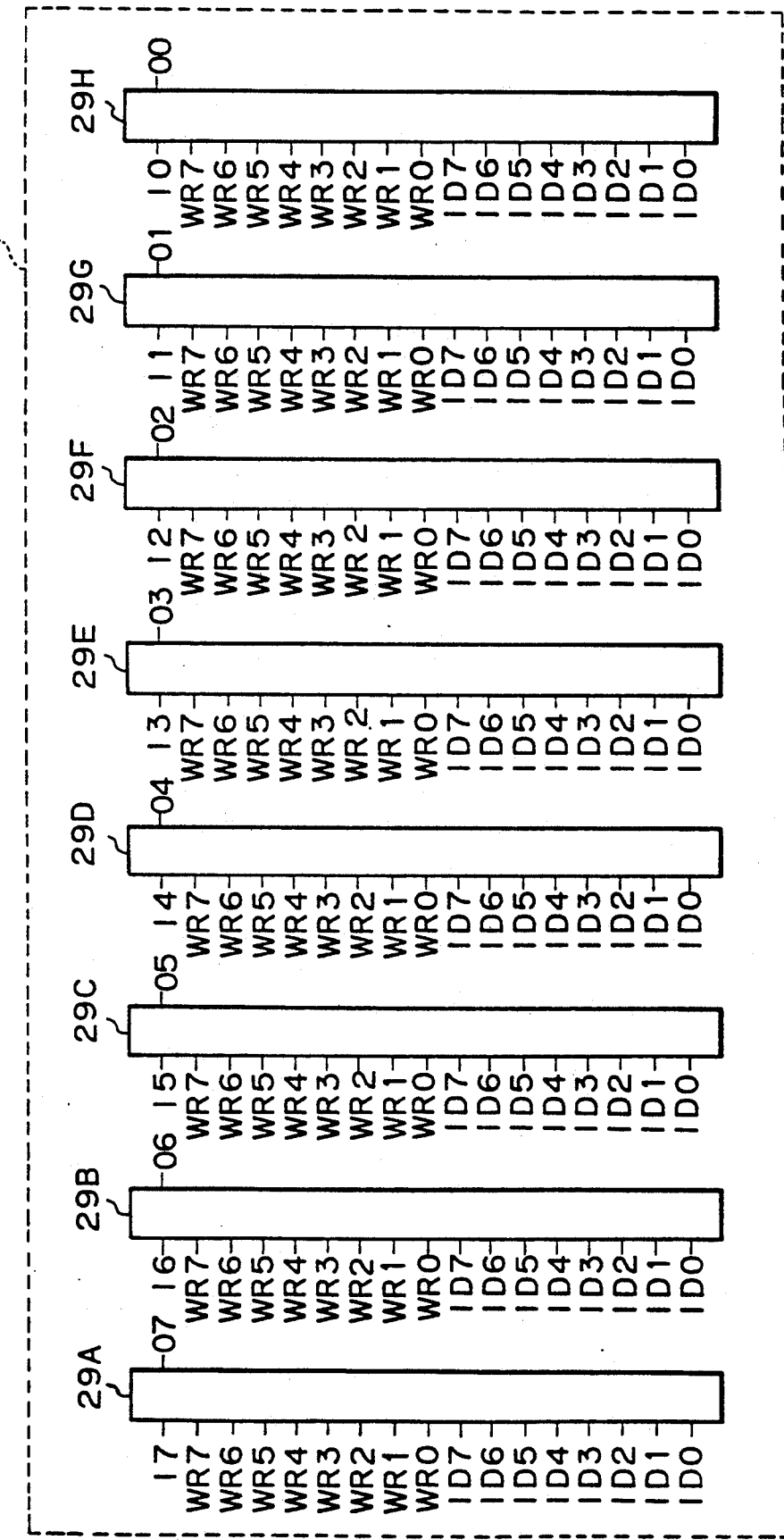
FIG. 6 is a schematic block diagram of another example of the transfer parameter storage unit 21 shown in FIG. 3.
Figure 7:
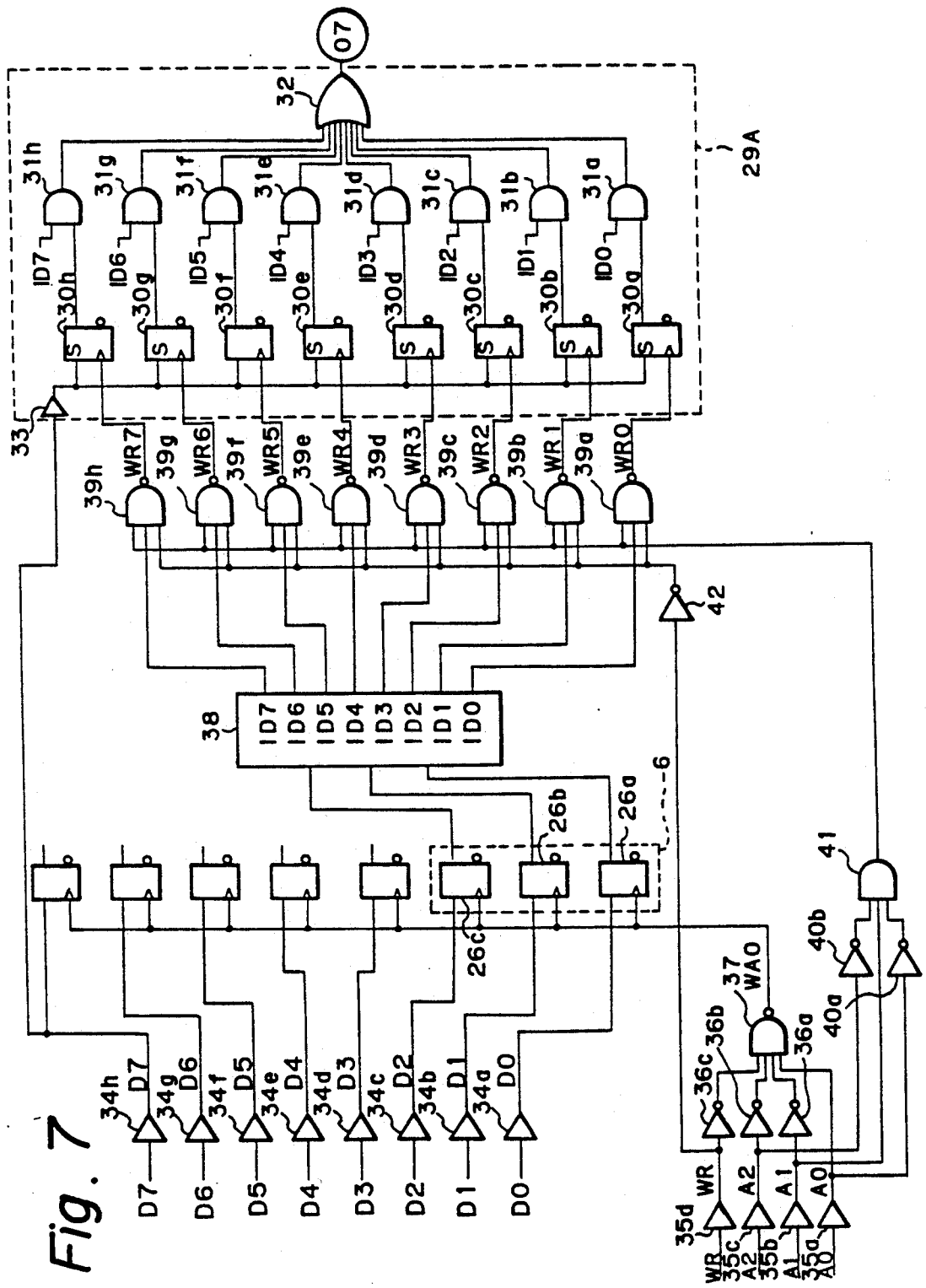
FIG. 7 is a partial detailed diagram of the transfer parameter storage unit shown in FIG. 6.

FIG. 6 is a schematic block diagram of another example of the transfer parameter storage unit 21 shown in FIG. 3, and FIG. 7 is a partial detailed diagram of the transfer parameter storage unit shown in FIG. 6. In FIG. 6, reference number 28 denotes a synchronous transfer offset register for previously storing the synchronous transfer offset data as one of the transfer parameters. The synchronous transfer offset register 28 is provided in the transfer parameter storage unit 21 and constituted by eight macro cells 29A to 29H each having the same structure. The synchronous transfer period register and the transfer width register, each having the same structure as the synchronous transfer offset register 28, are also provided in the transfer parameter storage unit 21.

In FIG. 7, the macro cell 29A of the synchronous transfer offset register 28 shown in FIG. 6 is constituted by eight flip-flop circuits 30a to 30h, eight AND circuits 31a to 31h, and an OR circuit 32. One input of the AND circuit 31 is connected to the output of the flip-flop circuit 30, the other input is connected to the decoder 38. The OR circuit 32 has eight input terminals connected to the output of the AND circuit 31. The data signal D7 is input to the set terminal S of each flip-flop circuit 30 through the buffer 33, and only the most significant bit of the synchronous transfer offset data of the other party is stored in each flip-flop circuit 30.

In the macro cells 29B to 29H shown in FIG. 6, the data signals D0 to D6 are input to the corresponding macro cell 29. That is, the data signal D6 is input to the set terminal S of each flip-flop circuit 30 of the macro cell 29B, and only the second upper bit of the synchronous transfer offset data of the other party is stored in the macro cell 29B. Similarly, the data signal D5 is input to the macro cell 29C and only the third upper bit of the synchronous transfer offset data of the other party is stored in the macro cell 29C. Similarly, the data signal D0 is input to the macro cell 29H and only the least significant bit of the synchronous transfer offset data of the other party is stored in the macro cell 29H.

An explanation is now given of the operation which writes the synchronous transfer offset data into the synchronous transfer offset register 28 shown in FIGS. 6 and 7. In FIG. 7, three bits D0 to D2 of data corresponding to the ID code of the other device, for example, the ID7 of the host computer 1, are input to the flip-flop circuits 26a to 26c of the ID setting register 6 through the buffers 34a to 34c. The address signal A0 to A2 having bits "001" and the write signal WR having a bit "0" are input to the buffer 35a to 35d. The address signals A1, A2 and the write signal WR are inverted by the inverters 36a to 36c, and input to the NAND circuit 37. Further, the NAND circuit 37 outputs the write signal WA0 having a bit "0".

Next, when the bit "0" of the write signal WR is changed to the bit "1", the NAND circuit 37 outputs the write signal WA0 having bit "1" in the ID setting register 6. When the write signal WA0 having bit "1" is input to the ID setting register 6, the data signals D0 to D2 of the ID code of the host computer 1 are set in the flip-flop circuits 26a to 26c and are output to the decoder 38. The decoder 38 outputs the bit "1" from the terminal ID7 to the NAND circuit 39h based on the data signals D0 to D2.

Further, the synchronous transfer offset data D0 to D7 of the other device (i.e., host computer 1) are input from the microprocessor to the buffers D0 to D7, and the address signals A0 to A2 are changed to "010". Accordingly, the address signals A0 and A2 are inverted by the inverters 40a and 40b so that the bit "1" is output from the AND gate 41 to the NAND circuits 39a to 39h.

Still further, the bit "1" of the write signal WR is changed to the bit "0", then the bit "0" is immediately changed to the bit "1". As a result, the write signal WR7 from the NAND circuit 39h is changed to three states, i.e., "1"→"0"→"1". These change of the bits are sequentially input to the flip-flop 30h of the macro 29A. Similarly, these change of the bits are sequentially input to the flip-flop 30h of the macro cells 29B to 29H. Accordingly, each bit of the synchronous transfer offset data D0 to D7 can be set in the flip-flop 30h of each macro cell 29A to 29H.

In the data transfer, three bits D0 to D2 of the ID code of the other party are input to the ID setting register 6, the address signals A0 to A3 are set to bits "0001", and the write signal WR is output to the ID setting register 6 so that the data signal D0 to D2 are set to the flip-flop circuits 26a to 26c. Accordingly, the bit "1" is output from any one of the terminals ID0 to ID7 of the decoder 38. For example, when the bit "1" is output from the terminal ID7 of the decoder 38, the ID7 is input to one input terminal of the AND circuit 31h so that it is possible to activate only the AND circuit 31h of the macro cell 29A. Accordingly, the content of the flip-flop circuit 30h can be output through the OR circuit 32. The same operations as mentioned above are performed in each of the macro cells 29B to 29H.

Figure 8:
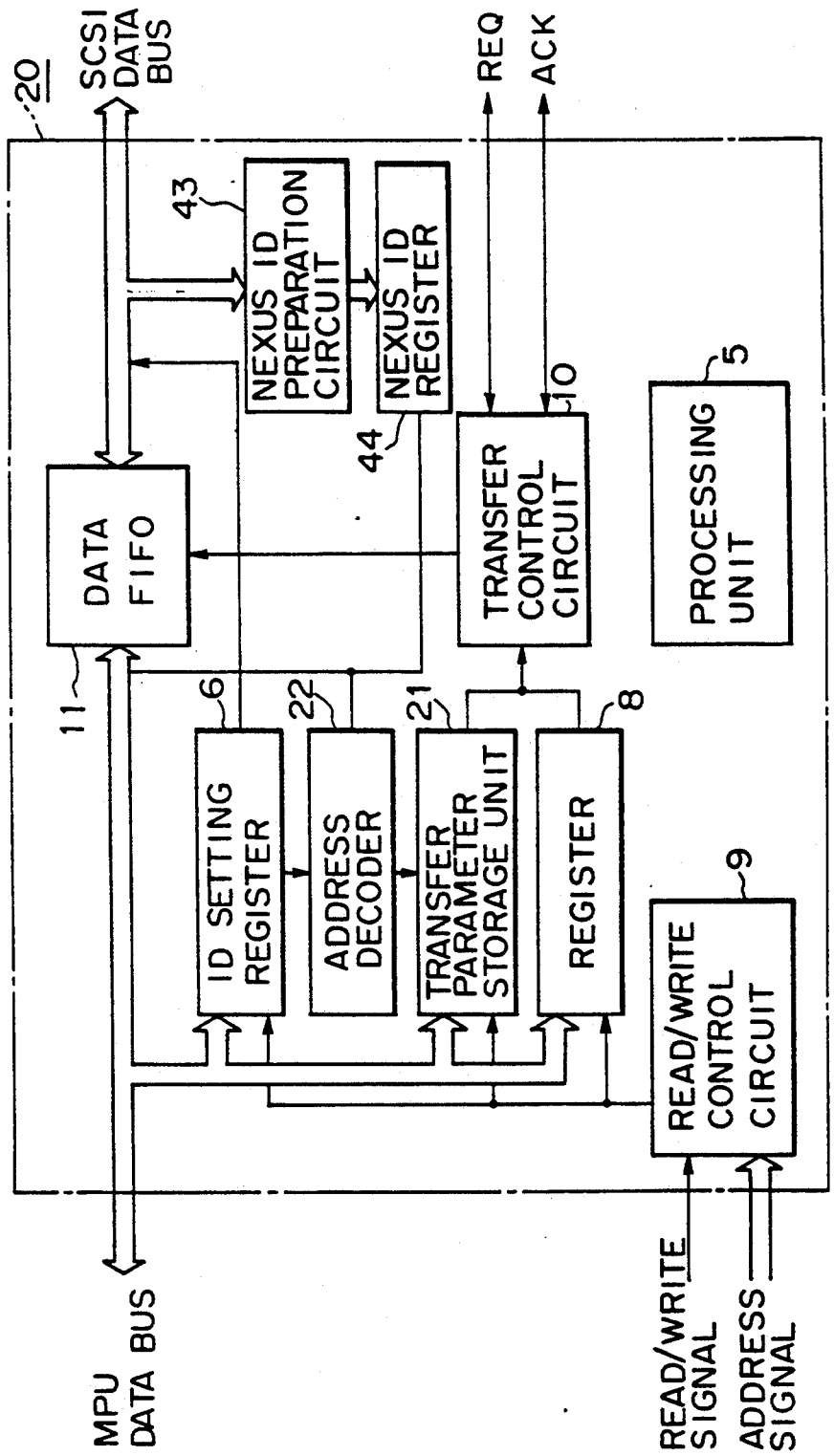
FIG. 8 is a schematic block diagram of a SCSI device according to a second embodiment of the present invention.

FIG. 8 is a schematic block diagram of a SCSI device according to a second embodiment of the present invention. The same reference numbers as used in FIG. 3 are attached to the same components in this drawing. In FIG. 8, reference number 43 denotes a nexus ID preparation circuit, and 44 denotes a nexus ID register. As is obvious from the drawing, in the second embodiment, the nexus ID preparation circuit 43 and the nexus ID register 44 are added to the circuit of the first embodiment shown in FIG. 3.

The nexus ID preparation circuit 43 is connected to the destination to which data is to be transferred through the SCSI data bus, and outputs the ID code of the other device to the nexus ID register 44 based on an OR operation for its own ID code and the ID code of the other device on the SCSI data bus. The ID code stored in the nexus ID register 44 is output to the address decoder 22. Accordingly, the ID code of the other party from the nexus ID register 44 is used instead of the ID code from the ID setting register 6. One of the memory areas 21a to 21h of the transfer parameter storage unit 21 is accessed by the output of the address decoder 22 so that the transfer parameters of the other device can be automatically selected from the accessed memory area. Accordingly, in this embodiment, it is not necessary for the microprocessor to set the ID code of the other party in the ID setting register 6. As a result, it is possible to improve the data transfer efficiency and to achieve high speed data transfer between the SCSI devices.

Figure 9:
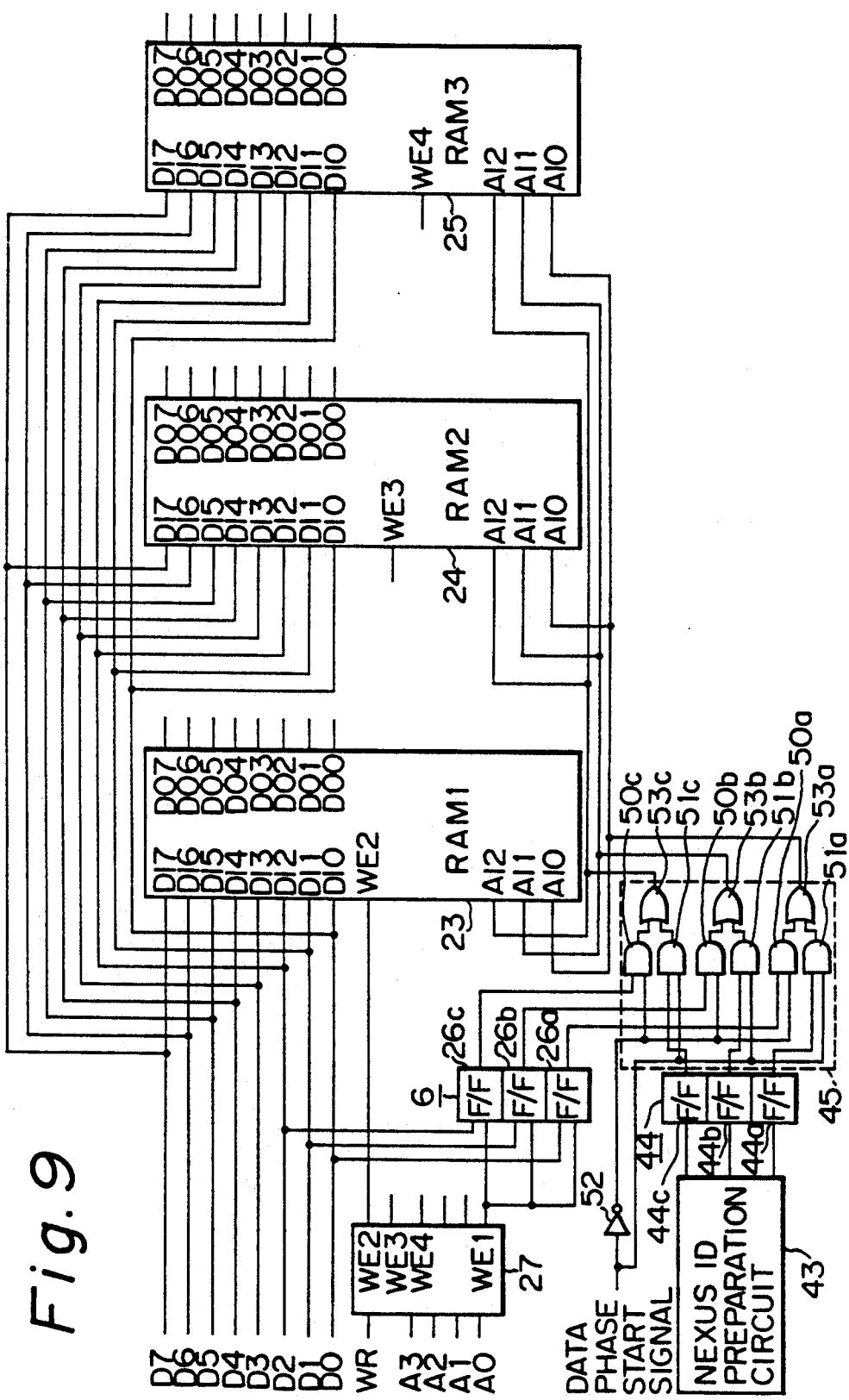
FIG. 9 is a detailed diagram of the second embodiment shown in FIG. 8.
Figure 10:
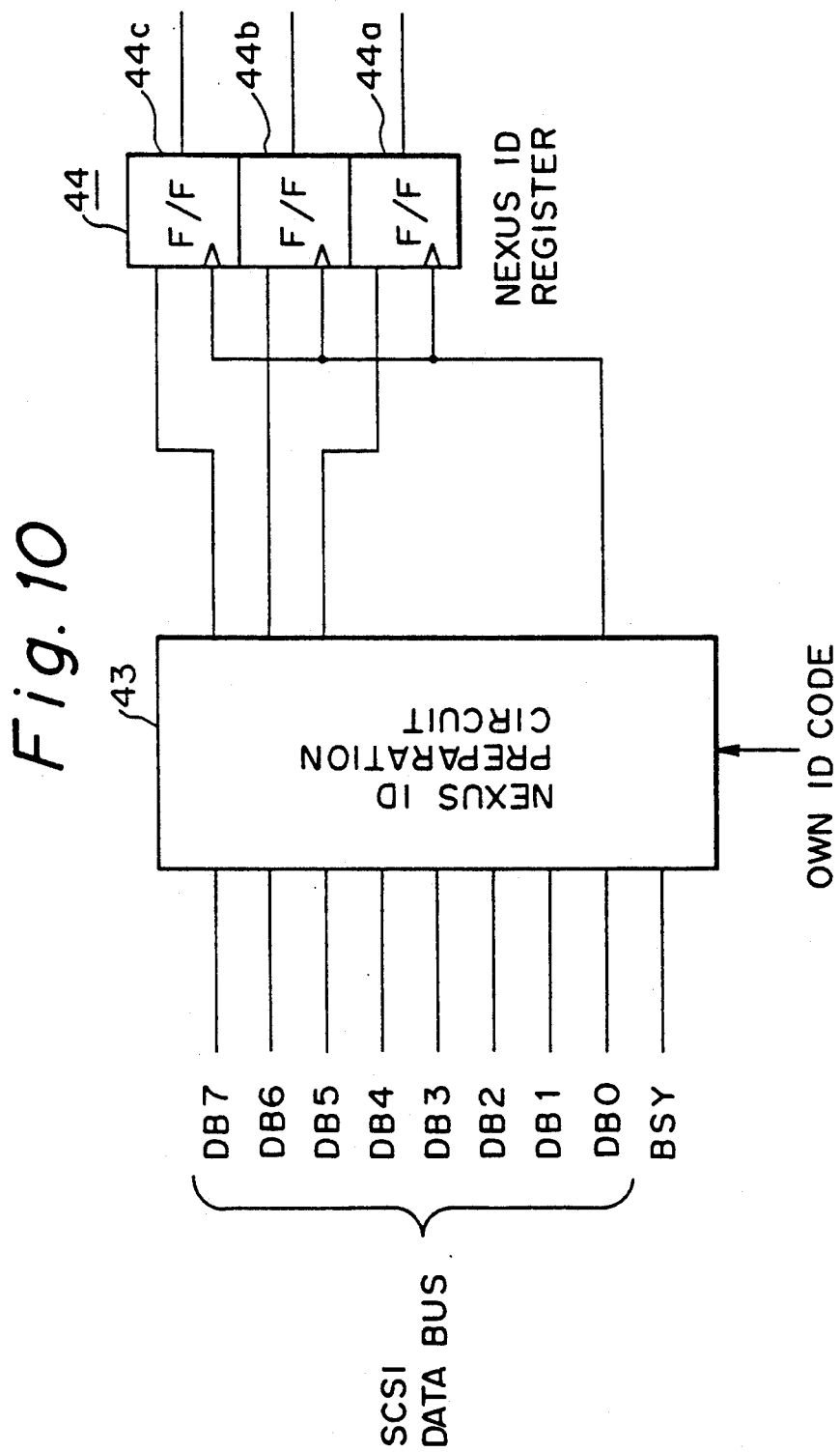
FIG. 10 is a view for explaining the connection relationship between the nexus ID preparation circuit and the nexus ID register shown in FIG. 8.
Figure 11:
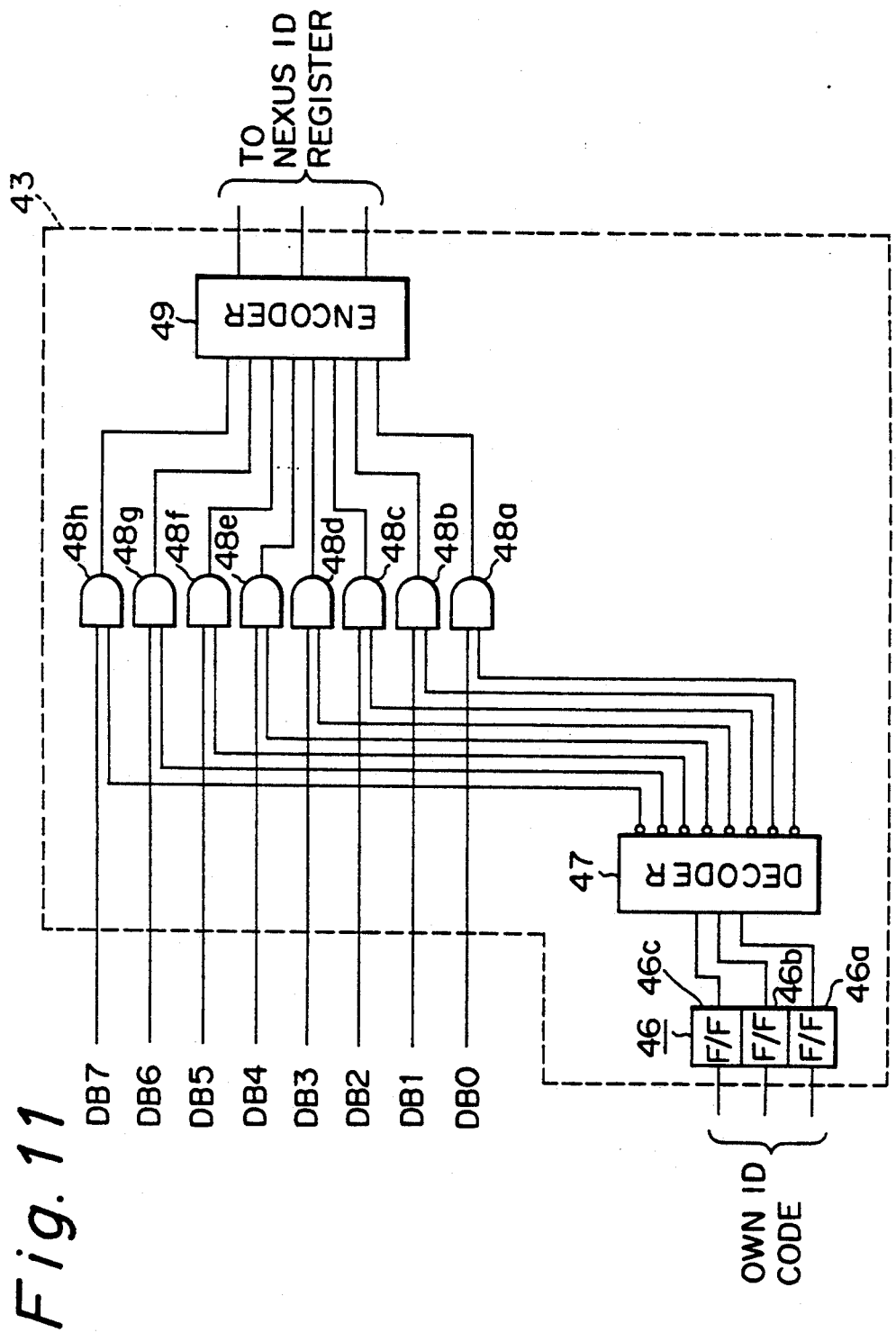
FIG. 11 is a detailed diagram of the nexus ID preparation circuit shown in FIG. 8.

FIG. 9 is a detailed diagram of the second embodiment shown in FIG. 8, FIG. 10 is a view for explaining the connection relationship between the nexus ID preparation circuit and the nexus ID register shown in FIG. 8, and FIG. 11 is a detailed diagram of the nexus ID preparation circuit shown in FIG. 8.

In FIG. 9, the same reference numbers as used in FIG. 5 are attached to the same components in this drawing. In this embodiment, a selection circuit 45 is added to the nexus ID register 44 for selecting either the ID setting register 6 or the nexus ID register 44 based on a data phase start signal from the SCSI-bus, the data phase start signal is obtained from message, command, status, etc. on the SCSI-bus. In this embodiment, the selection circuit 45 is constituted by six AND circuits 50a to 50c and 51a to 51c, and three OR circuits 53a to 53c. The inverter 52 is provided for inverting the data phase start signal.

In FIG. 10, eight bits DB0 to DB7 from the SCSI data bus are input to the nexus ID preparation circuit 43, further, the busy signal BSY is also input to the nexus ID preparation circuit 43. As shown in FIG. 11, the register 46 of the nexus ID preparation circuit 43 is constituted by three flip-flop circuits 46a to 46c, and stores its own ID code input from its own microprocessor. The decoder 47 receives the output of the register 46, decodes the ID code input from the flip-flop circuits 46a to 46c, outputs the bit "0" from any one of eight output terminals, and outputs the bit "1" from the remaining output terminals.

In FIG. 11, the outputs of the decoder 47 are input to one input terminal of the AND circuits 48a to 48h, eight bits DB0 to DB7 on the SCSI data bus are input to the other input terminal of the AND circuits 48a to 48h. The outputs of the AND circuits are input to the encoder 49. The encoder 49 is connected to the nexus ID register 44 as shown in FIG. 10. The nexus ID register 44 is constituted by three flip-flop circuits 44a to 44c.

In the selection circuit 45, the AND circuits 50a to 50c receive the outputs of the flip-flop circuits 26a to 26c and the data phase start signal inverted by the inverter 52. The AND circuits 51a to 51c receive the outputs of the flip-flop circuits 44a to 44c and the data phase start signal. The data phase start signal is an internal signal representing the state of the data transfer. The outputs of the AND circuits 50a to 50c and 51a to 51c are input to the corresponding OR circuits 53a to 53c. The outputs of the OR circuits 53a to 53c are input in parallel to the address signal terminals AI0 to AI2 of the RAMs 1 to 3.

In this embodiment, briefly, the apparatus performs an arbitration operation for acquiring the SCSI bus and selecting the other device by using the busy signal BSY and the selection signal SEL, and outputs resultant data for the OR operation between its own ID code and the ID code of the other device on the SCSI bus. After the above operation, the apparatus negates the busy signal BSY, and waits for a response from the other device asserting the busy signal BSY. In this case, the other device holds and asserts the ID code of the other device when, on the SCSI-bus, its own ID bit exists, bits more than three are not the bit "1", and parity bits are correct. Accordingly, the other device asserts the busy signal BSY in the predetermined time interval, the nexus (connection) between the apparatus and the other party is completed. At this time, the ID code is held in the nexus ID register. When the apparatus confirms the busy signal BSY asserted by the other party, the apparatus releases the selection signal SEL. After completion of a message phase transfer and a command phase transfer, the data transfer phase is started. In the data transfer, when the synchronous transfer is recognized between the apparatus and the other device, the nexus ID register 44 accesses the address decoder 22 and the address decoder selects the transfer parameters corresponding to the ID code of the other device from the transfer parameter storage unit 21.

The detailed operation is explained with reference to FIGS. 9 to 11. When the data transfer is started, the data phase start signal is set to the bit "1" and input in parallel to the AND gates 51a to 51c. Accordingly, the outputs of the flip-flop circuits 44a to 44c of the nexus ID register 44 are selected in the AND circuits 51a to 51c. The outputs of the AND circuits 51a to 51c are input to the address terminals AI0 to AI2 in each RAMs 1 to 3 through the OR circuits 53a to 53c. The address signals corresponding to the ID code of the other device are accessed in each of RAMs 1 to 3. As a result, the offset data is output from the output terminals DO0 to DO7 in the RAM 1, the period data is output from the output terminals DO0 to DO7 in the RAM 2, and the transfer width is output from the output terminals DO0 to DO7 in the RAM 3.

When the data transfer is not started, the data phase start signal is set to the bit "0". The bit "0" is inverted to the bit "1" by the inverter 52 and input to the AND circuits 50a to 50c. Accordingly, the outputs of the flip-flop circuits 26a to 26c are selected in the AND circuits 50a to 50c. The outputs of the AND circuits 50a to 50c are input to the address terminals AI0 to AI2 in each of RAMs 1 to 3 through the OR circuits 53a to 53c. Accordingly, the transfer parameters of the other device are previously stored in the RAMs 1 to 3.

The selected ID code of the other device is held in the nexus ID register 44 in such a way that the nexus ID preparation unit 43 outputs the ID code of the other device to the nexus ID register, in this case, the ID code to be transferred from the unit 43 to the register 44 is obtained by eliminating the ID code of its own SCSI device after the OR operation for its own ID code and the ID code of the other device on the SCSI data bus when selecting the other device, and the busy signal BSY is negated in the selection side (i.e., the BSY signal becomes high on the SCSI data bus). Further, the SCSI device confirms its own ID code on the SCSI data bus by utilizing a parity check, and asserts the busy signal BSY (i.e., the BSY signal becomes low on the SCSI data bus). As a result, the connection (nexus) is completed. For example, when the host computer 1 having the ID code ID7 selects the hard disk 2 having the ID code ID6, the host computer 1 changes the bits DB6 and DB7 of the SCSI data bus from "0" to "1" so that the busy signal BSY is negated by the host computer 1.

Figure 12:
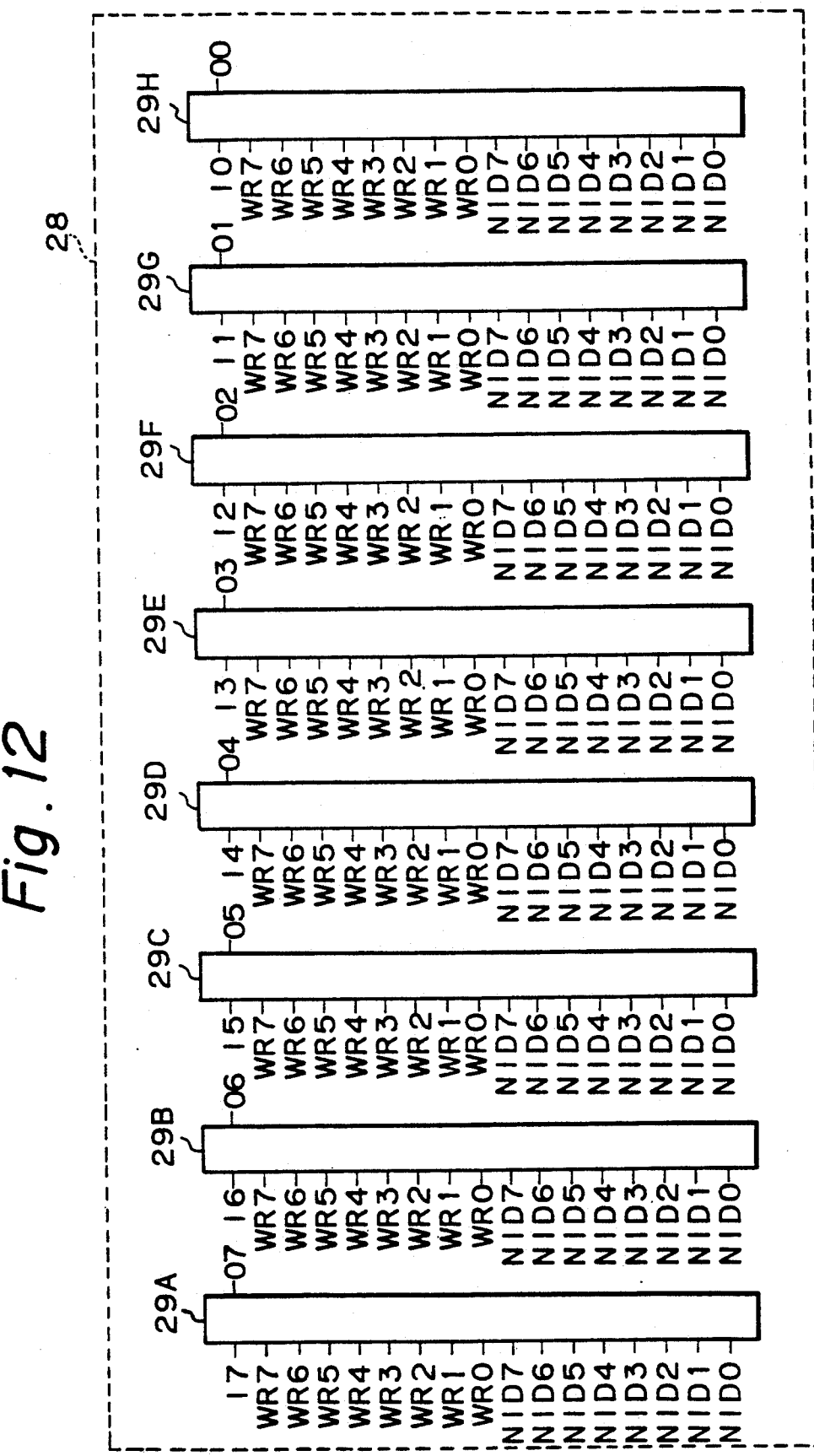
FIG. 12 is a schematic block diagram of another example of the transfer parameter storage unit 21 shown in FIG. 8.
Figure 13:
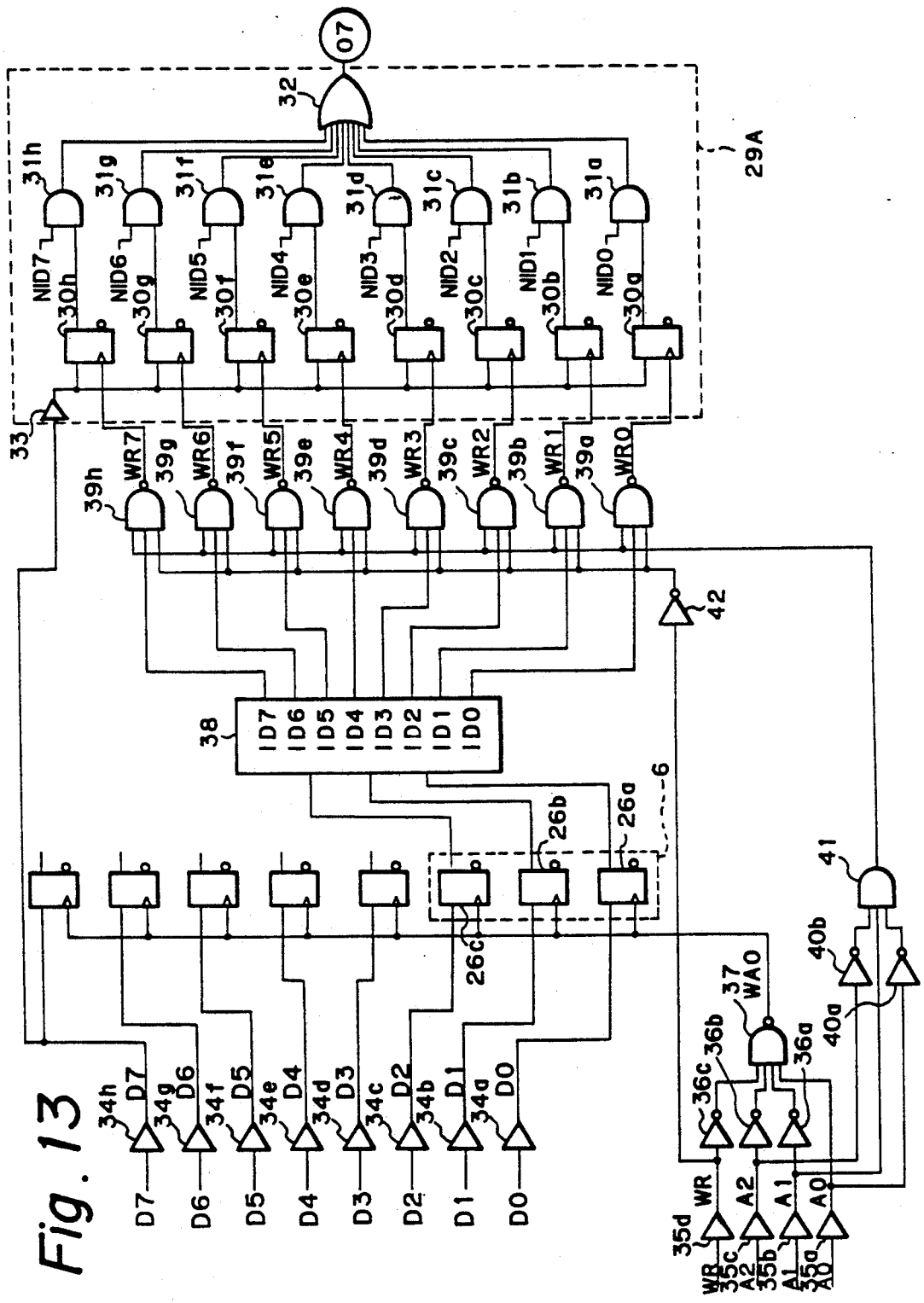
FIG. 13 is a partial detailed diagram of the transfer parameter storage unit shown in FIG. 12.
Figure 14:
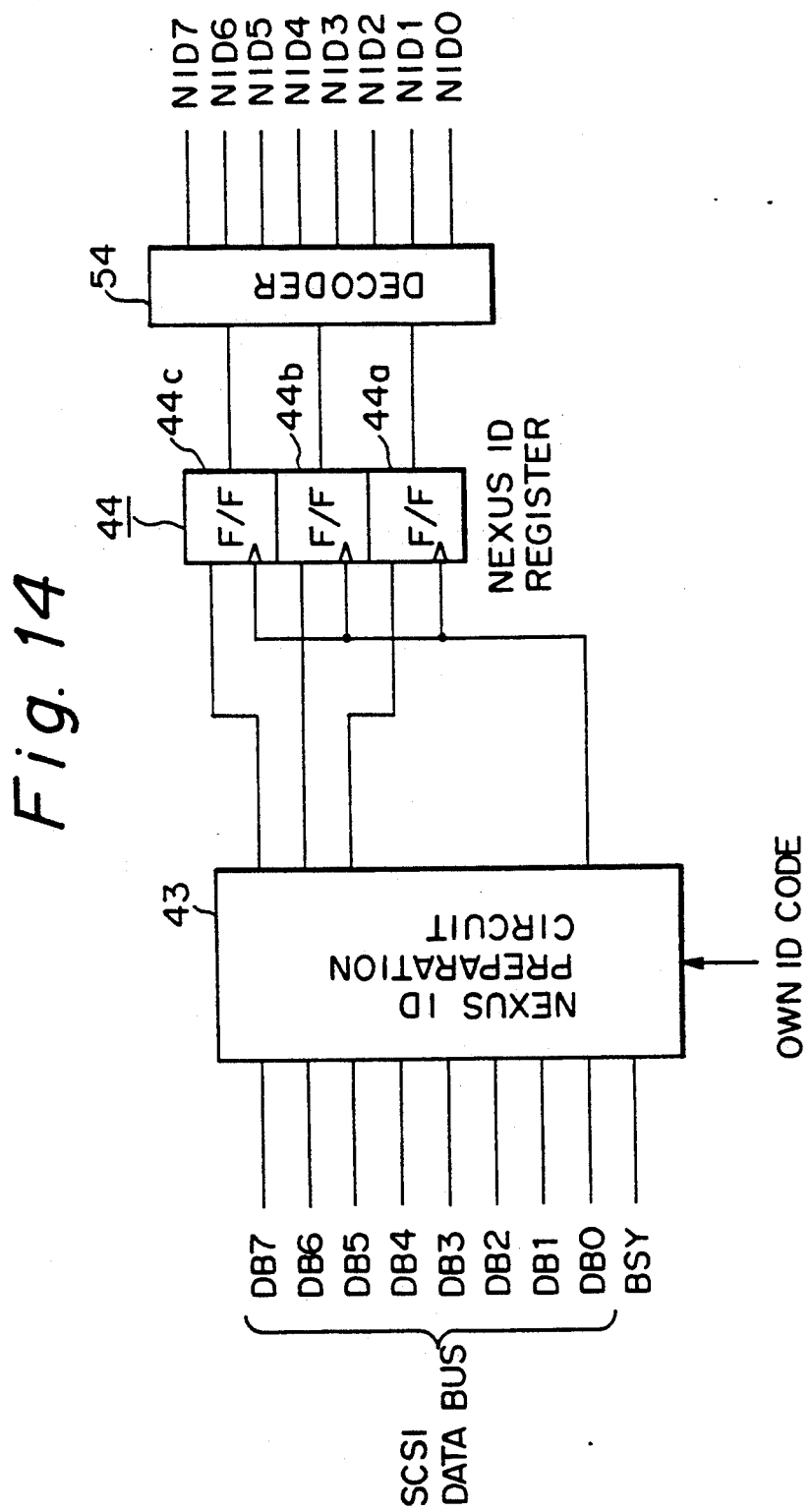
FIG. 14 is a view for explaining the connection to the nexus ID preparation circuit.

FIG. 12 is a schematic block diagram of another example of the transfer parameter storage unit 21 shown in FIG. 8, FIG. 13 is a partial detailed diagram of the transfer parameter storage unit shown in FIG. 12, and FIG. 14 is a view for explaining connection relationship among the nexus ID preparation circuit, the nexus ID register, and the parameter setting decoder. The input side of the parameter setting decoder 54 in FIG. 14 is connected to the flip-flop circuits 44a to 44c of the nexus ID register 44, and the output terminals NID0 to NID7 are connected to the AND circuits 31a to 31h of each of macros 29A to 29H shown in FIGS. 12 and 13.

Accordingly, when the ID code of the other party is determined, the bit "1" is output from any one of the output terminals NID0 to NID7 so that the same AND circuit 31 in the macro cells 29A to 29H is activated, and the content of the AND circuit is output through the OR circuit 32. For example, when the bit "1" is output from the output terminal NID7 of the parameter setting decoder 54, the AND circuit 31 in each of macro cells 29A to 29H is activated so that the content of the OR circuit 30h is output through the OR circuit 32.

I claim:

1. A SCSI device in a small computer system including a plurality of apparatuses, each of said apparatuses having a similar SCSI device connected to a microprocessor in the apparatus by a MPU (microprocessor) bus, and each apparatus connected to each other through the SCSI device and a SCSI bus, said SCSI bus carrying a plurality of signals including request signals, acknowledge signals, and data phase start signals with each apparatus having an identification (ID) code, said SCSI device comprising:

an ID setting register (6) operatively connected to the MPU bus for setting the ID code of one of said plurality of apparatuses;

an address decoder (22) operatively connected to the ID setting register for decoding the ID code;

a transfer parameter storage means (21) operatively connected to the MPU bus and the address decoder for storing transfer parameters for all apparatuses constituting the small computer system, said transfer parameter storage means being divided into a plurality of memory blocks equivalent to the number of the apparatuses to store the transfer parameters for each apparatus;

a register (8) operatively connected to the MPU bus for storing data from the MPU bus;

a read/write control means (9) for receiving a read/write signal for an address signal from the microprocessor, and for outputting these signals to the ID setting register, the transfer parameter storage means, and the register;

a data FIFO (11) connected between the SCSI bus and the MPU bus for temporarily storing data; and a transfer control means (10) operatively connected to the data FIFO and the transfer parameter storage means for controlling the transfer of the data based on a request signal and an acknowledge signal from the SCSI bus.

2. A SCSI device as claimed in claim 1, wherein each of said memory blocks is divided into a plurality of memory areas, and each of said memory blocks stores transfer parameter data comprising synchronous transfer offset data, synchronous transfer period data, and transfer width data.

3. A SCSI device as claimed in claim 2, wherein said plurality of memory areas comprises a first RAM 1 storing the synchronous transfer offset data, a second RAM 2 storing the synchronous transfer period data, and a third RAM 3 storing the transfer width data, each of said RAMS having a plurality of address terminals thereon.

4. A SCSI device as claimed in claim 1 or 2, wherein said ID setting register comprises three flip-flop circuits (26a to 26c) for receiving the address signal and the ID code, and outputting the ID code in parallel to said address terminals (AI0 to AI2) in each of RAMs 1 to 3.

5. A SCSI device as claimed in claim 1 or 2, wherein said transfer parameter storage means comprises a synchronous transfer offset register for previously storing the synchronous transfer offset data, a synchronous transfer period register for previously storing the synchronous transfer period data, and a transfer width register for previously storing transfer width data.

6. A SCSI device as claimed in claim 5, wherein said each register comprises eight macro cells (29A to 29H), each macro cell corresponding to one apparatus.

7. A SCSI device as claimed in claim 6, wherein said each macro cell comprises eight flip-flop circuits (30a to 30h), each flip-flop circuit receiving one bit of data; eight AND circuits (31a to 31h) connected to the eight flip-flop circuits, each AND circuit receiving the ID code; and an OR circuit (32) connected to eight AND circuits for receiving outputs of eight AND circuits.

8. A SCSI device as claimed in claim 1, further comprising a nexus ID preparation means (43) operatively connected to the SCSI bus, and a nexus ID register (44) operatively connected to the nexus ID preparation means and the address decoder, wherein the nexus ID preparation means outputs the ID code of the one of the plurality of apparatuses to the nexus ID register, the ID code to be transferred from the nexus ID preparation means to the nexus ID register being obtained by eliminating the ID code of its own SCSI device after an OR operation for its own ID code and the ID code of the other device on the SCSI-bus, and wherein the nexus ID register outputs the ID code of the other device to the address decoder to set the transfer parameters of said one of said plurality of other apparatuses.

9. A SCSI device as claimed in claim 8, further comprising a selection circuit (45) for selecting either the ID setting register (6) or the nexus ID register (44) based on a data phase start signal on the SCSI-bus.

10. A SCSI device as claimed in claim 9, further comprising an inverting means coupled to said selection circuit for inverting said data phase start signal, wherein said selection circuit comprises three AND circuits (50a to 50c) for receiving the output of the ID setting register and an inverted data phase start signal from the SCSI-bus, three AND circuits (51a to 51c) for receiving the output of the nexus ID register and the data phase start signal, and OR circuits (53a to 53c) for receiving outputs of AND circuits (50a to 50c and 51a to 51c) and outputting the ID code to the address terminals (AI0 to AI2) in each of RAMs 1 to 3.

11. A SCSI device as claimed in claim 8, wherein said nexus ID register comprises three flip-flop circuits (44a to 44c) for receiving the ID code from the nexus ID preparation circuit, and outputting the ID code in parallel to the selection circuit 45.

12. A SCSI device as claimed in claim 8, wherein said nexus ID preparation circuit comprises a register (46) for receiving its own ID code, a decoder (47) for decoding the ID code, eight AND circuits (48a to 48c) for receiving the output of the decoder and the data from the SCSI bus, and an encoder (49) for receiving the output of the AND circuits and outputting the ID code to the nexus ID register.

* * * * *